(12) United States Patent
Sakamoto et al.

(10) Patent No.: US 12,716,905 B2
(45) Date of Patent: Aug. 25, 2026

(54) AUTOMATIC ANALYZER AND SEPARATION COLUMN INSTALLATION METHOD FOR SAME

(71) Applicant: Hitachi High-Tech Corporation, Tokyo (JP)

(72) Inventors: Naoto Sakamoto, Tokyo (JP); Takayuki Sugime, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 939 days.

(21) Appl. No.: 17/908,112

(22) PCT Filed: Jan. 26, 2021

(86) PCT No.: PCT/JP2021/002566
§ 371 (c)(1),
(2) Date: Aug. 30, 2022

(87) PCT Pub. No.: WO2021/176885
PCT Pub. Date: Sep. 10, 2021

(65) Prior Publication Data

US 2023/0098770 A1 Mar. 30, 2023

(30) Foreign Application Priority Data

Mar. 4, 2020 (JP) ................................ 2020-036373

(51) Int. Cl.
*G01N 35/00* (2006.01)
*G01N 30/46* (2006.01)
*G01N 30/86* (2006.01)

(52) U.S. Cl.
CPC ....... *G01N 35/00732* (2013.01); *G01N 30/46* (2013.01); *G01N 30/86* (2013.01);
(Continued)

(58) Field of Classification Search
CPC .. G01N 35/00732; G01N 30/46; G01N 30/86; G01N 2035/00752;
(Continued)

(56) References Cited

U.S. PATENT DOCUMENTS 5,892,458 A * 4/1999 Anderer et al. ....... G16H 10/40 340/10.41
10,082,489 B2 * 9/2018 Iovanni et al. ........ B01D 15/10 210/143
(Continued)

FOREIGN PATENT DOCUMENTS

CN 110168362 A 8/2019
JP 9-171022 A 6/1997
(Continued)

OTHER PUBLICATIONS

International Search Report, PCT/JP2021/002566, Apr. 20, 2021, 3 pgs.
Office Action issued on Feb. 24, 2024 for Chinese Patent Application No. 202180016882.9.

*Primary Examiner* — John McGuirk
(74) *Attorney, Agent, or Firm* — Volpe Koenig

(57) ABSTRACT

In an automatic analyzer where a plurality of types of separation column are selectively used for performing a chromatographic analysis, an automatic analyzer configured to install a separation column of an intended type at an aimed position, and a method for installing the separation column in the automatic analyzer are provided. Identification mechanisms, a computer, and a display unit are included. The identification mechanisms read identifiers included in separation columns when the separation columns are installed at installation positions. The computer determines whether identification information of the identifiers read by the identification mechanisms matches an installation pattern registered in advance or not. The display unit notifies an alarm when the identification information is
(Continued)

determined not to match the installation pattern by the computer.

12 Claims, 11 Drawing Sheets

(52) U.S. Cl.
CPC .............. *G01N 2035/00752* (2013.01); *G01N 2035/00831* (2013.01); *G01N 2035/00851* (2013.01); *G01N 2035/009* (2013.01)

(58) Field of Classification Search
CPC .......... G01N 2035/00831; G01N 2035/00851; G01N 2035/009; G01N 2030/8804; G01N 30/88
See application file for complete search history.

(56) References Cited

U.S. PATENT DOCUMENTS

| | | | |
|---|---|---|---|
| 2012/0239676 A1 | 9/2012 | Kaneko et al. | |
| 2017/0010243 A1 | 1/2017 | Gaita et al. | |
| 2019/0033271 A1 * | 1/2019 | Sabolis | G01N 30/6047 |
| 2019/0369070 A1 | 12/2019 | Terada et al. | |

FOREIGN PATENT DOCUMENTS

| | | |
|---|---|---|
| JP | 2011-99679 A | 5/2011 |
| JP | 2017-508960 A | 3/2017 |
| WO | 2011-067888 A1 | 6/2011 |

* cited by examiner

<table>
<tr><th>SETTING</th><th>FLOW PASSAGE 1</th><th>FLOW PASSAGE 2</th><th>FLOW PASSAGE 3</th><th>FLOW PASSAGE 4</th><th>FLOW PASSAGE 5</th></tr>
<tr><td>1</td><td colspan="3">TYPE1</td><td colspan="2">ANY</td></tr>
<tr><td>2</td><td colspan="2">TYPE1</td><td colspan="2">TYPE2</td><td>ANY</td></tr>
<tr><td>3</td><td colspan="2">TYPE1</td><td>TYPE2</td><td>TYPE3</td><td>TYPE4</td></tr>
<tr><td>4</td><td>TYPE1</td><td>TYPE2</td><td>TYPE3</td><td>TYPE4</td><td>TYPE5</td></tr>
</table>

AUTOMATIC ANALYZER AND SEPARATION COLUMN INSTALLATION METHOD FOR SAME

TECHNICAL FIELD

The present invention relates to an automatic analyzer for analyzing contents of a biological sample and a method of separation column installation in the automatic analyzer, and more particularly, to an automatic analyzer in which plural columns can be installed in parallel in a separation unit thereof and a method of separation column installation therein.

BACKGROUND ART

An automatic analyzer for analyzing a biological sample such as blood and urine is disclosed in Patent Literature 1. The automatic analyzer is, for purposes of operation efficiency improvement, human error elimination, and analysis efficiency enhancement, configured as follows. The automatic analyzer includes an operation unit for managing, in an integrated manner, one or more analysis units to carry out analysis, and the operation unit is provided with a means, for example, a barcode reader or an RFID reader, for reading identification information for identifying samples and reagents. The automatic analyze has a function to read, using the means, identification information affixed on sample or reagent containers, automatically search examination information stored in an examination information storage means provided in the operation unit for referable examination information and display a search result on a screen included in the operation unit, a function to transition, when the user selects target examination information on the search result display screen, to a screen displaying details of the examination information, and a function to return from the details screen to the examination result screen.

CITATION LIST

Patent Literature

Patent literature 1: International Publication 2011/067888

SUMMARY OF INVENTION

Technical Problem

In a liquid chromatograph, from impurities, an analysis object is isolated or plural analysis objects are mutually separated using a separation column containing a filler called a stationary phase.

In the mutual separation, a sample is injected into a liquid flow called a mobile phase and moves in a stationary phase (filler) in a separation column. While the sample moves in the stationary phase, differences between materials contained in the sample in terms of the intensities of their reactions against the stationary phase cause analysis objects to be separated.

The separation column is an expendable item, and when it is repeatedly used involving filler contamination and deterioration, it comes to require replacement. Also, it is necessary to use various types of columns as required depending on object samples, analysis objects, and separation methods.

Generally, separation columns are manually replaced by users, but human errors may cause wrong types of columns to be installed, or, even when correct types of columns are selected, may cause the selected columns to be installed in wrong positions.

Such errors result in causing solvents of inappropriate compositions to be injected into columns, eventually preventing analysis objects from being adequately separated. This makes it impossible to have adequate amounts of analysis objects introduced into the detection unit, and, therefore, detection accuracy deteriorates. Furthermore, depending on the combination of the column filler and solvent composition, desorption and dissolution may develop due to chemical factors and columns may break down.

Therefore, at the time of column replacement, it is very important to install specific types of columns in specific positions.

A technique which can be need as a means for inhibiting human errors concerning installation in an automatic analyzer is described in Patent Literature 1. In the technique according to Patent Literature 1, identification information given by, for example, RFID tags or barcodes affixed on reagent containers are mechanically read and the identification information read is managed being associated with positions in a refrigerator included in the analyzer.

Applying the technique described in Patent Literature 1 to separation column installation will be studied below.

In this case, it may be considered to affix column type identifiers such as REID tags to separation columns, mechanically read them, and display the identification information read on a screen in the operation unit in a form associated with column installation positions in the separation unit.

However, using the technique in installation error management generates problems as described below.

For example, in the case of the reagent container considered in Patent Literature 1, a main purpose is to make recognizable by the analyzer what reagents are placed in which positions in the refrigerator included in the analyzer, and, basically, which reagent containers are installed in which positions does not matter. This is because when reagent dispensing is necessary, where the reagent container is installed may be searched for based on the stored identification information, then, after position alignment, the reagent may be sucked in and dispensed.

In the case of separation columns, also, by reading identification information, the analyzer can be made to recognize which types of separation columns are installed in which positions. However, because separation columns let a mobile phase pass through them, preprocessing such as equilibration and cleansing made using a buffer and purging of flow passages connected to the separation columns becomes necessary. Therefore, considering that separation columns are only required to be installed in other than predetermined specific positions is inappropriate. Thus, it has become apparent that simply, applying the technique leaves a problem.

The present invention has been made in view of the above problem and provides an automatic analyzer for making chromatographic analysis selectively using plural types of separation columns wherein intended types of separation columns can be installed in aimed positions and a method of separation column installation in the automatic analyzer.

Solution to Problems

The present invention includes plural means for solving the above problem. For example, the automatic analyzer includes: an identification unit which reads, when the separation columns are installed in installation positions, identifiers the separation columns are respectively provided with; a determination unit which determines whether or not identification information read from the identifiers matches an installation pattern registered beforehand; and a notification unit which notifies alarm when the identification information is determined, in the determination unit, not to match the installation pattern.

BRIEF DESCRIPTION OF THE DRAWINGS

FIG. 4 is a schematic diagram related to the position of the injection valve illustrated in FIG. 2;

FIG. 7 is a drawing illustrating an exemplary predefined pattern assuming that a maximum of three same type separation columns are installable on five flow passages in the automatic analyzer according to the embodiment;

FIG. 10 is a drawing illustrating a display example of a screen for selecting the predefined pattern illustrated in FIG. 7 to register a maximum installation number of the separation columns.

ADVANTAGEOUS EFFECTS OF INVENTION

According to the present invention, intended types of separation columns can be installed in aimed positions. Other objects, configurations and effects than described above will be made clear in the description of the following embodiment.

DESCRIPTION OF EMBODIMENTS

An embodiment of the automatic analyzer and the method of separation column installation in the automatic analyzer according to the present invention will be described with reference to FIGS. 1 to 10. In the following, the description of parts common between plural drawings may be omitted as appropriate.

The present embodiment of the automatic analyzer will be described taking as an example a multi-item automatic analyzer (hereinafter referred to simply as an “automatic analyzer” or an “analyzer”) which can preprocess a biological sample such as blood or urine (hereinafter referred to simply as a “sample”) using a reagent and magnetic beads, separate substances of the sample by liquid chromatography, and analyze the masses of ionized substances. Needless to say, the form of the automatic analyzer is not limited to this.

Figure 1:
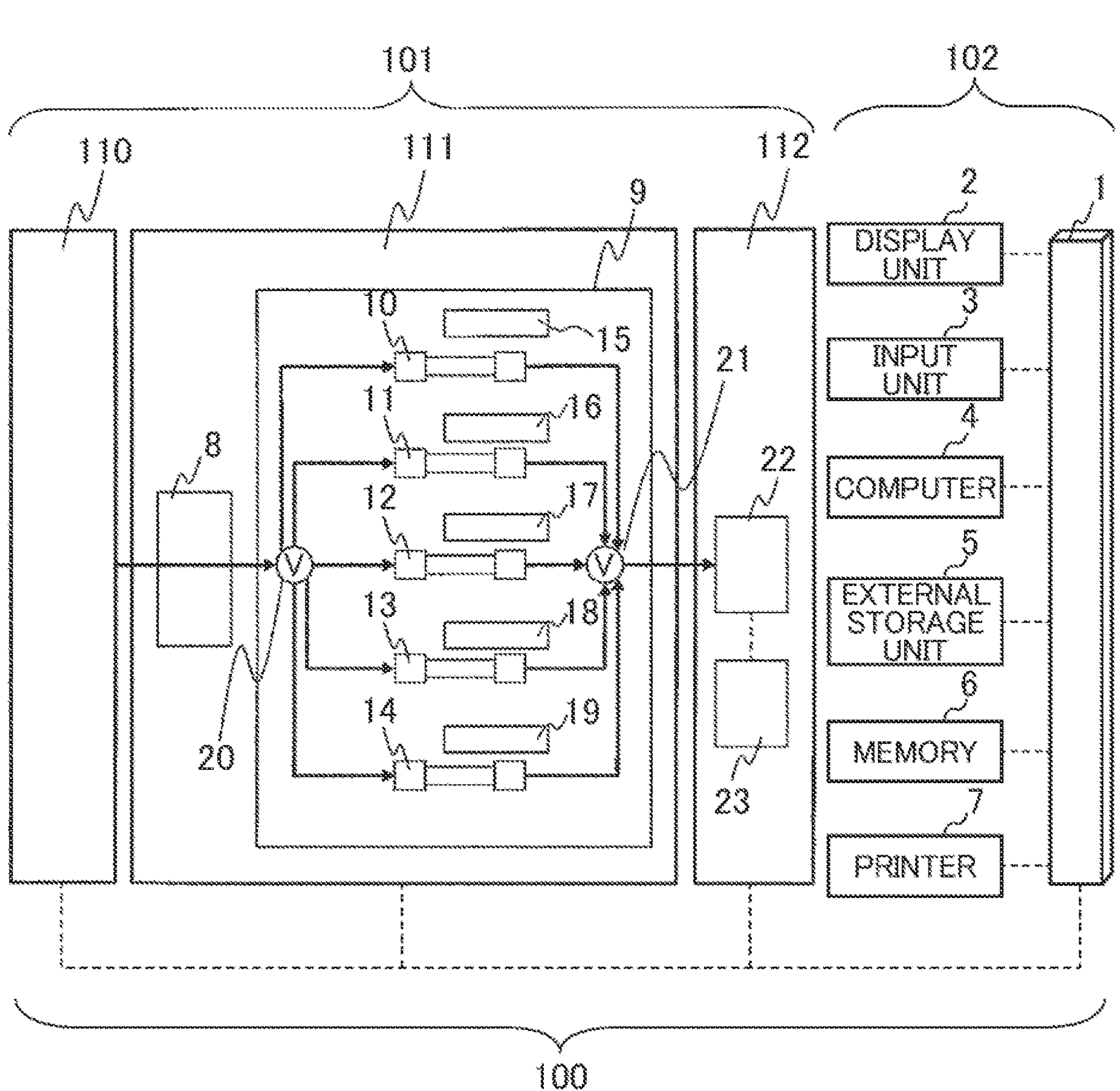
FIG. 1 is a drawing schematically illustrating a basic configuration of an automatic analyzer according to the embodiment.
Figure 2:
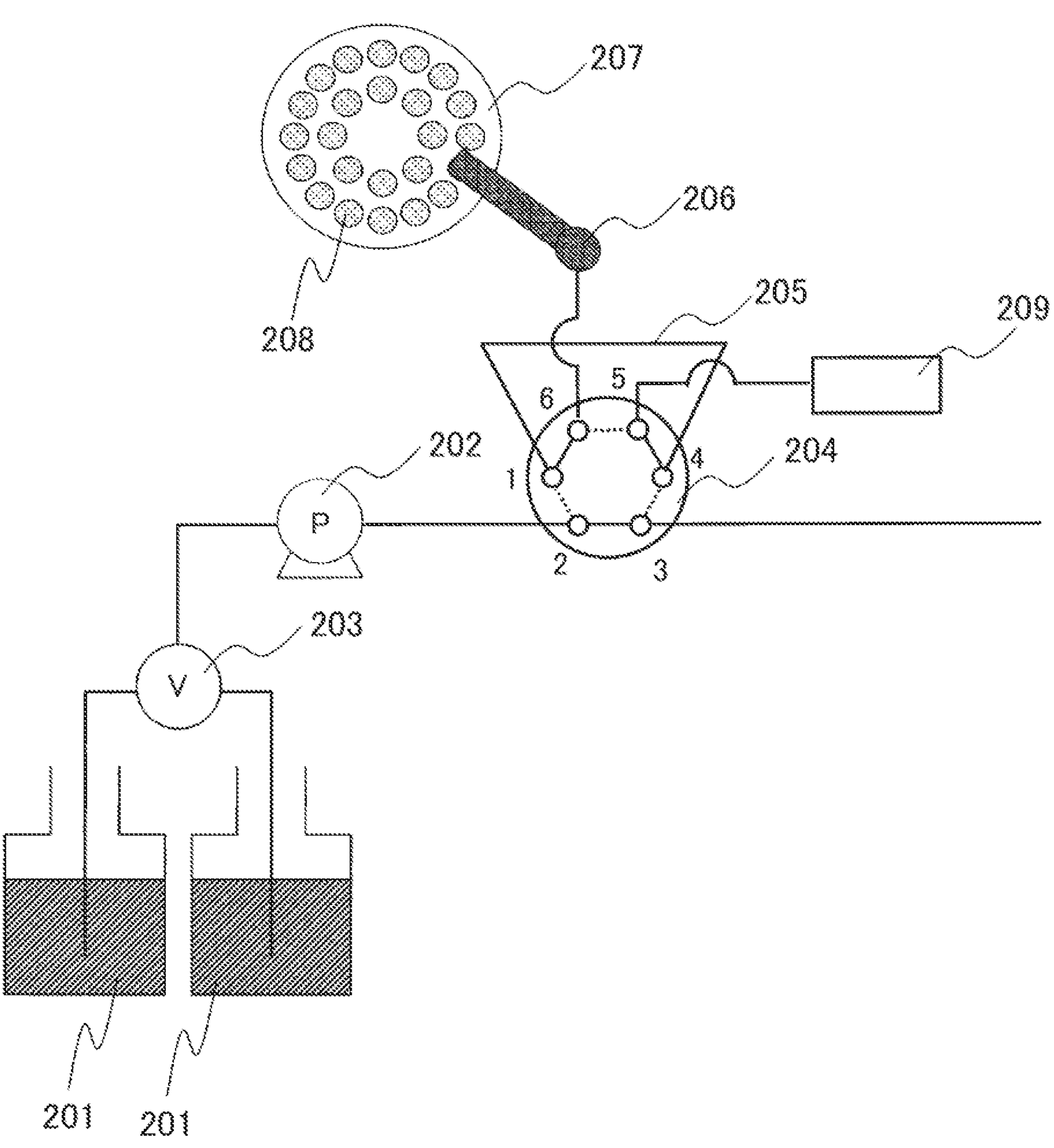
FIG. 2 is a schematic diagram illustrating a configuration of a sample introduction unit illustrated in FIG. 1.
Figure 3:
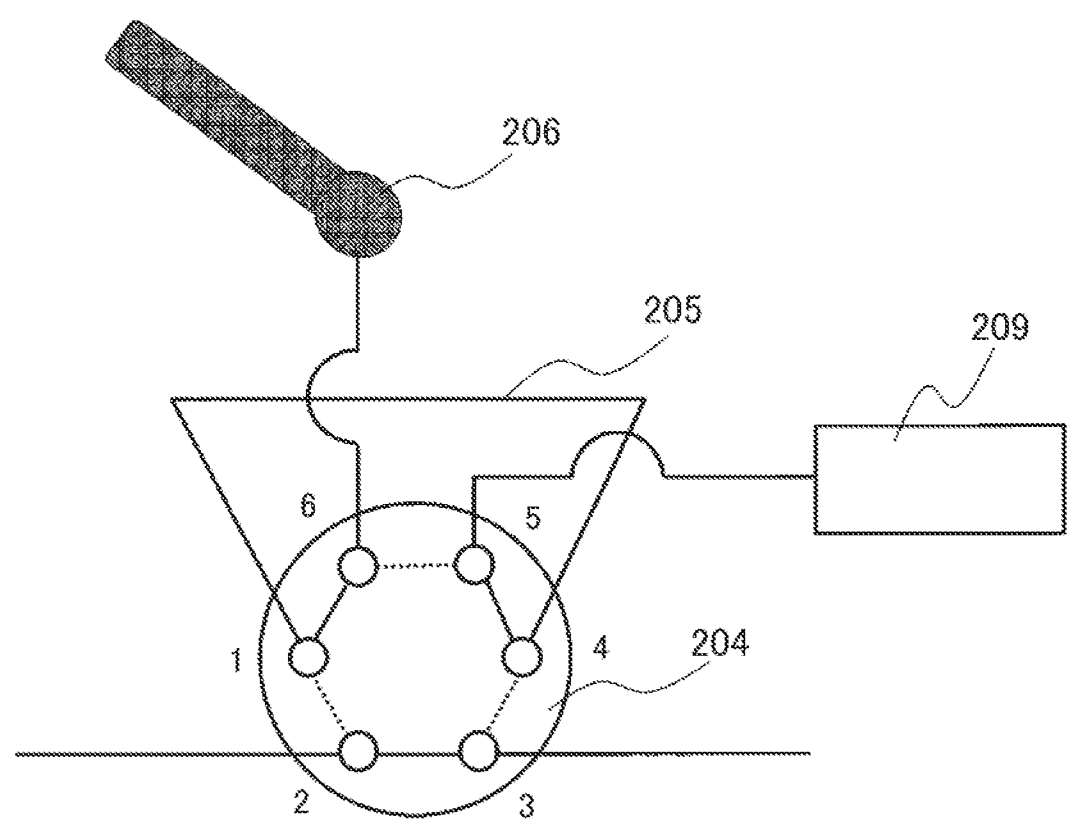
FIG. 3 is a schematic diagram related to a position of an injection valve illustrated in FIG. 2.
Figure 4:
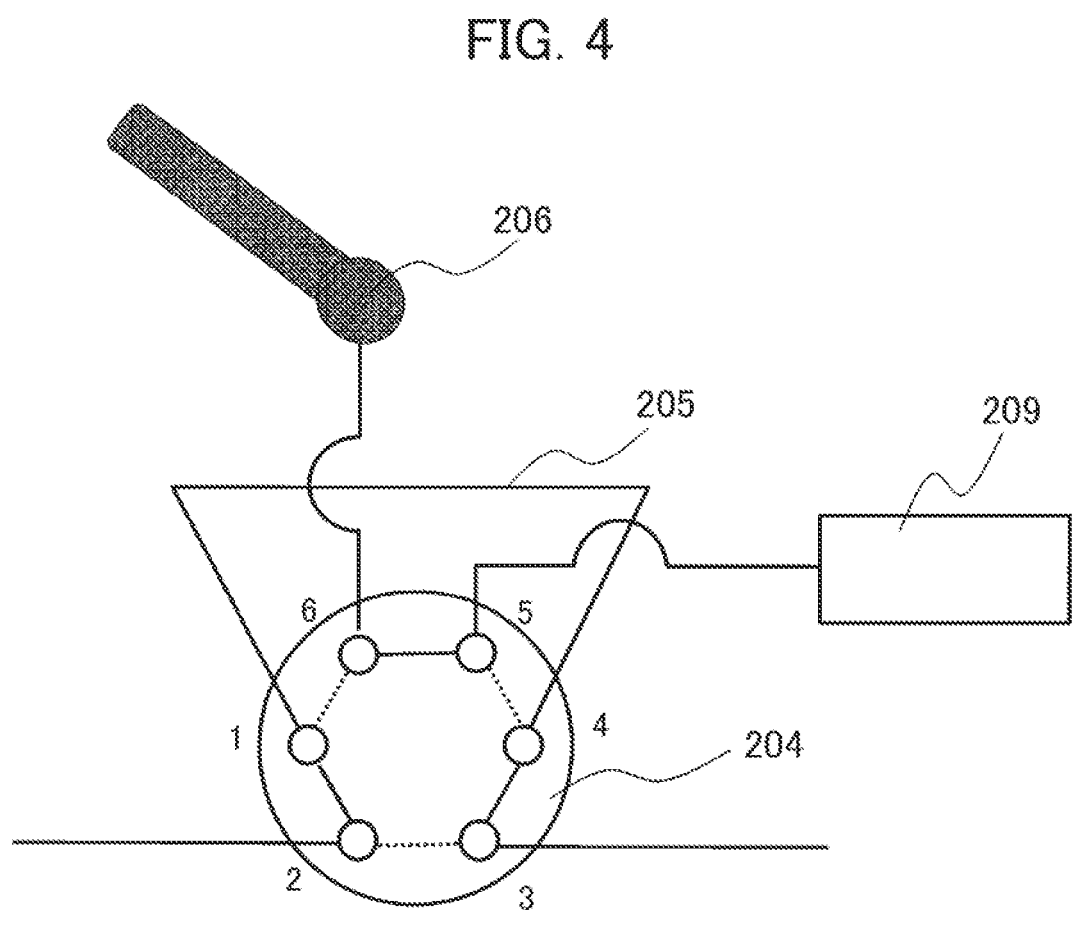
Figure 5:
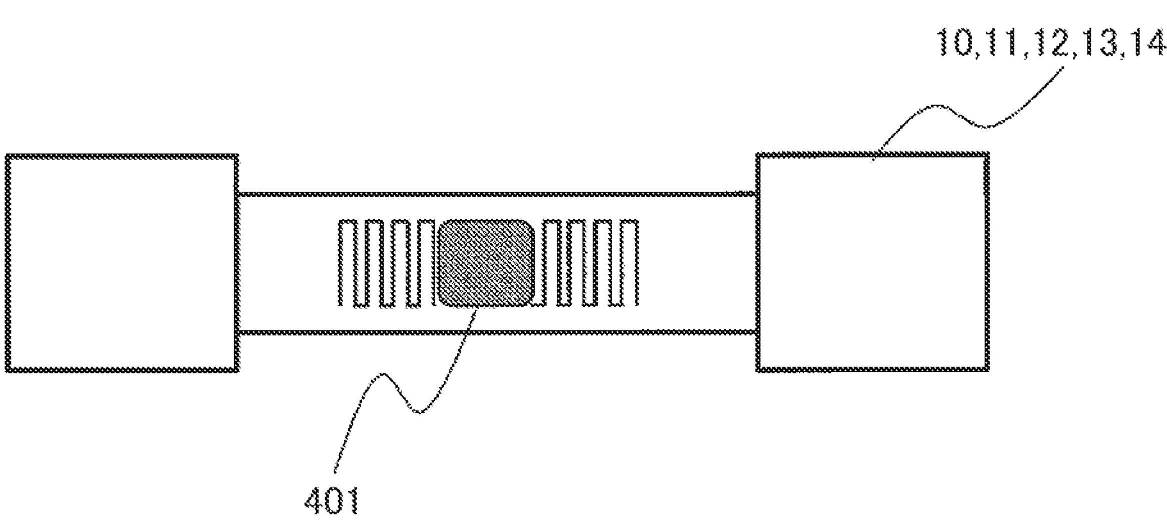
FIG. 5 is a schematic diagram illustrating an exemplary separation column and an exemplary separation column identifier in the automatic analyzer according to the embodiment.

First, the overall configuration and details of parts of the automatic analyzer will be described with reference to FIGS. 1 to 5. FIG. 1 is a drawing schematically illustrating a basic configuration of the automatic analyzer according to the present embodiment. FIG. 2 is a schematic diagram illustrating a configuration of a sample introduction unit illustrated in FIG. 1. FIG. 3 and FIG. 4 are schematic diagrams related to the position of the injection valve illustrated in FIG. 2. FIG. 5 is a schematic diagram illustrating an exemplary separation column and an exemplary separation column identifier.

Referring to FIG. 1, the automatic analyzer 100 includes an analysis unit 101 configured mainly with a preprocessing unit 110, a separation unit 111 and a detection unit 112 and a control unit 102 configured mainly with an interface 1, a display unit 2, an input unit 3, a computer 4, an external storage unit 5, a memory 6 and a printer 7.

The preprocessing unit 110 introduces a sample dispensed from a source specimen into the separation unit 111 after removing from the sample, using a reagent, magnetic beads (hydrophobic interactions) and an extraction solvent, unnecessary substances not to be analyzed.

The separation unit 111 includes a sample introduction unit 8 to introduce the sample refined in the preprocessing unit 110 into separation columns 10, 11, 12, 13, 14 and a separation column oven 9 in which the separation column 10, 11, 12, 13, 14 to separate an object of analysis can be installed in parallel.

As shown in FIG. 2, the sample introduction unit 8 includes a solvent sending pump 202 to feed a sample introduction solvent 201, a solvent switch valve 203 to control the composition of the sample introduction solvent 201, an injection valve 204, a sample loop 205, a sipper 206, and a syringe 209 which sucks the solution refined in the preprocessing unit 110 from a reaction vessel 208 held by a reaction solution disk 207 and introduces the sample into the sample loop 205.

The injection valve 204 is a hexagonal valve which can by switching flow passages, flow two flow passage patterns. In position 1 shown in FIG. 3, flow passages connecting ports 1 and 6, ports 2 and 3, and ports 4 and 5 are formed. In position 2 shown in FIG. 4, flow passages connecting ports 1 and 2, ports 2 and 3, and ports 4 and 5 are formed.

When the sample is sucked, the injection valve 204 controlled to be in position 1 shown in FIG. 3, and the sipper 206, the sample loop 205 and the syringe 209 are connected. At the same time, the sample introduction solvent 201, the solvent switch valve 203, the solvent sending pump 202, and a first separation column selector valve 20 are connected.

After the reaction solution disk 207 rotates to a predetermined object position, the sipper 206 descends and sucks the sample from the reaction vessel 208 held by the reaction solution disk 207 to fill the sample loop 205 with the sample to, thereby, complete the preparation for flowing a mobile phase into the separation columns 10, 11, 12, 13, 14. The sample suction speed of the syringe 209 can be set, under control of the computer 4, to an optimum value for each analysis object.

When introducing the sample into the separation columns 10, 11, 12, 13, 14, the injection valve 204 is controlled to be in position 2 sown in FIG. 4, and the sample introduction solvent 201, solvent switch valve 203, solvent sending pump 202, sample loop 205, and first separation column selector valve 20 are connected. This makes it possible to introduce the sample along the flew of the mobile phase, into the separation columns 10, 11, 12, 13, 14.

The separation column oven 9 holds, in the flow passage therein, the separation columns 10, 11, 12, 13, 14 for separating an analysis object from foreign substances in parallel and is configured to adjust the temperature of the separation columns 10, 11, 12, 13, 14.

Also, the separation column oven 9 is externally provided with the first separation column selector valve 20 and a second separation column selector valve 21 for optionally connecting any of the separation columns 10, 11, 12, 13, 14 to the flow passage. A specific one of the separation columns 10, 11, 12, 13, 14 to be connected with the first separation column selector valve 20 and second separation column selector valve 21 is selected under control of the computer 4 included in the control unit 102.

Furthermore, in the present embodiment, identification mechanisms 15, 16, 17, 18, 19 corresponding to the separation columns 10, 11, 12, 13, 14 are respectively disposed near the separation columns. As being described later, when the separation columns 10, 11, 12, 13, 14 are installed in their respective positions, the identification mechanisms 15, 16, 17, 18, 19 respectively read information given by identifiers 401 affixed to the separation columns.

As shown in FIG. 5, in the present embodiment, an identifier 401 is affixed to the side surface of each of the separation columns 10, 11, 12, 13, 14. The identifier 401 provides a separation column identification number for identifying a separation column type.

The identifiers 401 read by the identification mechanisms 15, 16, 17, 18, 19 when the separation columns 10, 11, 12, 13, 14 are installed in their respective positions are inputted to the computer 4 via the interface 1. The separation column identification numbers are associated with the separation column installation positions in the separation column oven 9 and are stored in the memory 6 or in an appropriate memory area of the computer 4.

The identifiers 401 may be optically readable ones, for example, barcodes (regardless of whether one dimensional or two dimensional) or ones to be read using radio waves (IC tags, radio tags), but they are not limited to these types and may be of any other type as far as information given by them can be read.

For example, by reading the identifiers 401 of the separation columns 10, 11, 12, 13, 14 installed in installation positions in the separation column oven 9 in the separation unit 111, the identification mechanisms 15, 16, 17, 16, 19 determine what types of separation columns 10, 11, 12, 13, 14 are installed in which positions.

For example, when the identifiers 401 are barcodes, barcode readers to emit laser beams to the barcodes and detect reflected light are used. When the identifiers 401 are RFIDs, RFID readers are used. Like the identifiers 401, the identification mechanisms may also be of any type of configuration as far as they can read information given by the identifiers 401.

The identification mechanisms 15, 16, 17, 18, 19 make it possible to appropriately execute an identification step in which, when the separation columns 10, 11, 12, 13, 14 are installed in installation positions, the identifiers 401 affixed to the separation columns 10, 11, 12, 13, 14 are read.

Referring back to FIG. 1, the detection unit 112 ionizes the sample separates in the separation unit 111 to let the ionized sample fly in vacuum. Making use of an electrical action, the analysis object is separated from the flying ions according to the mass-to-charge ratio (m/z) and is detected by the detector 22. As a result, relative intensity variations of the analysis object can be detected at intervals in the form of detection peaks (mass spectrum).

The mass spectrum based on the analysis object obtained by the detector 22 is subjected to analog-to-digital signal conversion by the A/D converter 23 to be then inputted to the computer 4 via the interface 1. The digital signals are converted, by quantitative value calculation processing based on detection peak area values, to density values of the analysis object component of the sample.

The data having undergone conversion to represent densities is outputted via the interface 1; for example, printed out by an output device such as the printer 7, displayed on the screen of the display unit 2, or stored in the memory 6 or in the external storage unit 5.

The display unit 2 in the control unit 102 is a device for displaying various information based on directions for display from the computer 4 and is configured including an input screen for various parameters and settings and a liquid crystal display for displaying information such as analysis data and measurement results obtained in an initial examination or in a re-examination. The display unit 2 may be a display device of a touch panel type for use also as the input unit 3 being described later.

The input unit 3 is a mechanism for inputting direction signals to the computer 4 via the interface 1 and is configured including a keyboard and a mouse which are used to input various data representing, for example, various parameters and settings, analysis request, and analysis start directions.

The computer is a device for caking various arithmetic processing and controls operations of various devices included in the automatic analyzer 100 based on computer programs stored in the memory 6 being described later.

The computer 4 of the present embodiment executes a determination step in which whether or not the identification information read from the identifiers 401 by the identification mechanisms 15, 16, 17, 18, 19 matches the pre-registered installation pattern is determined and a notification step in which, when the identification information is determined not to match the installation pattern, an alarm is notified. The computer 4 also controls the display of various setting screens such as the separation column installation pattern registration screen 25 and the separation column maximum installation number registration screen 28. These will be described in detail later.

The external storage unit 5 is a recording medium arbitrarily removable from the interface 1, for example, an external USB memory. The information stored in the external storage unit 5 includes, for example, analysis item codes and parameters used for the analysis items. The parameters used fox the analysis items include a preprocessing method, a separation method, and a detection method. Such information is stored in the memory 6 or in an appropriate memory area in the computer 4.

The memory 6 stores, in addition to the information read from the external storage unit 5, operating conditions for various mechanisms of the automatic analyzer 100, analysis parameters for each analysis item, determination logic for reagent management, and analysis results.

The memory 6 is a recording device, for example, a semiconductor memory like a flash memory or a magnetic disk as included in an HDD (Hard Disk Drive). Various parameters and setting values for controlling operations of devices included in the automatic analyzer 100 and various computer programs for executing various display processing are also recorded in the memory 6.

The overall configuration of the automatic analyzer 100 has been described above.

Figure 6:
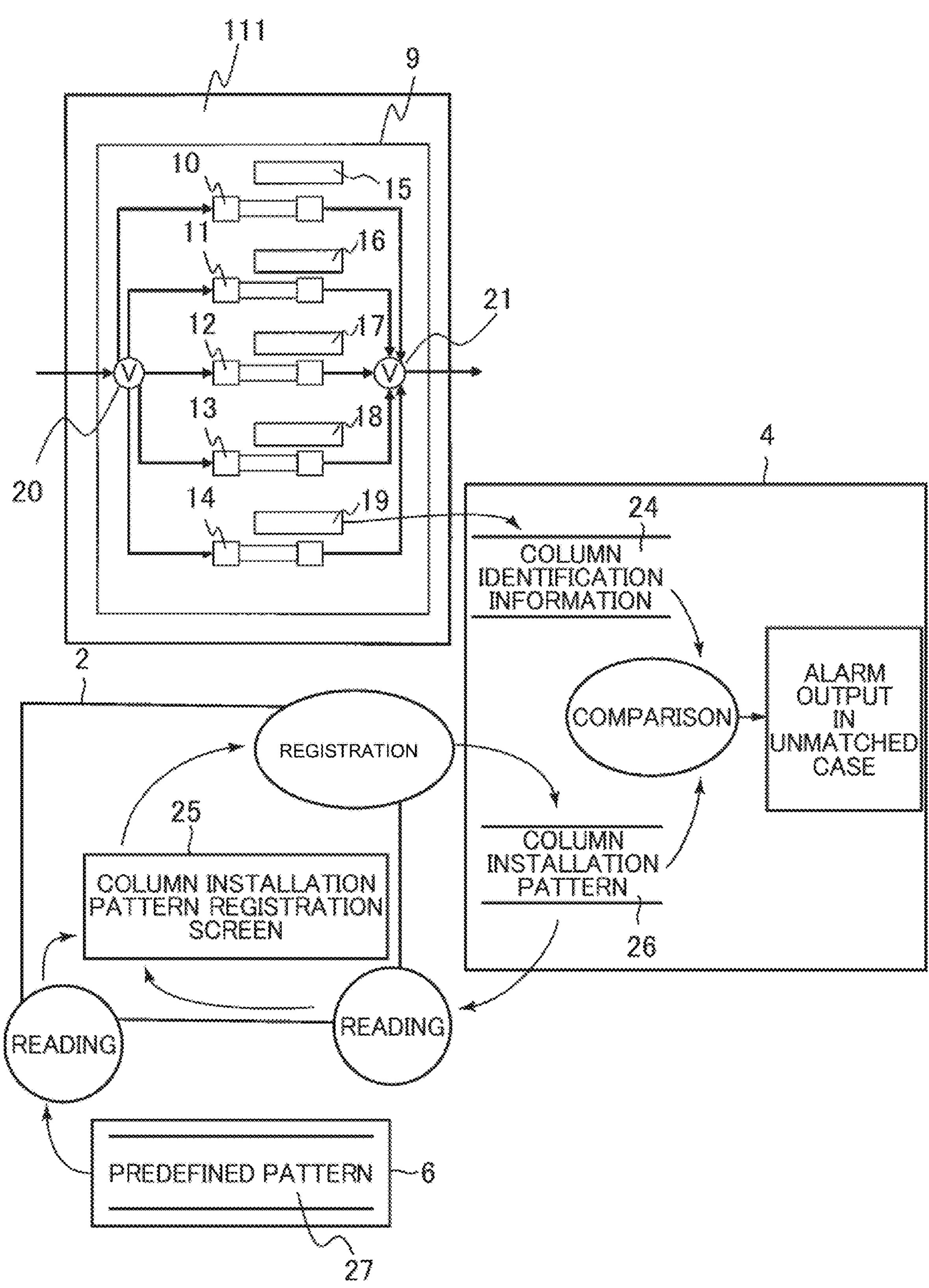
FIG. 6 is a drawing schematically illustrating a state of a comparison between separation column identification information and separation column installation pattern in the automatic analyzer according to the embodiment.
Figure 8:
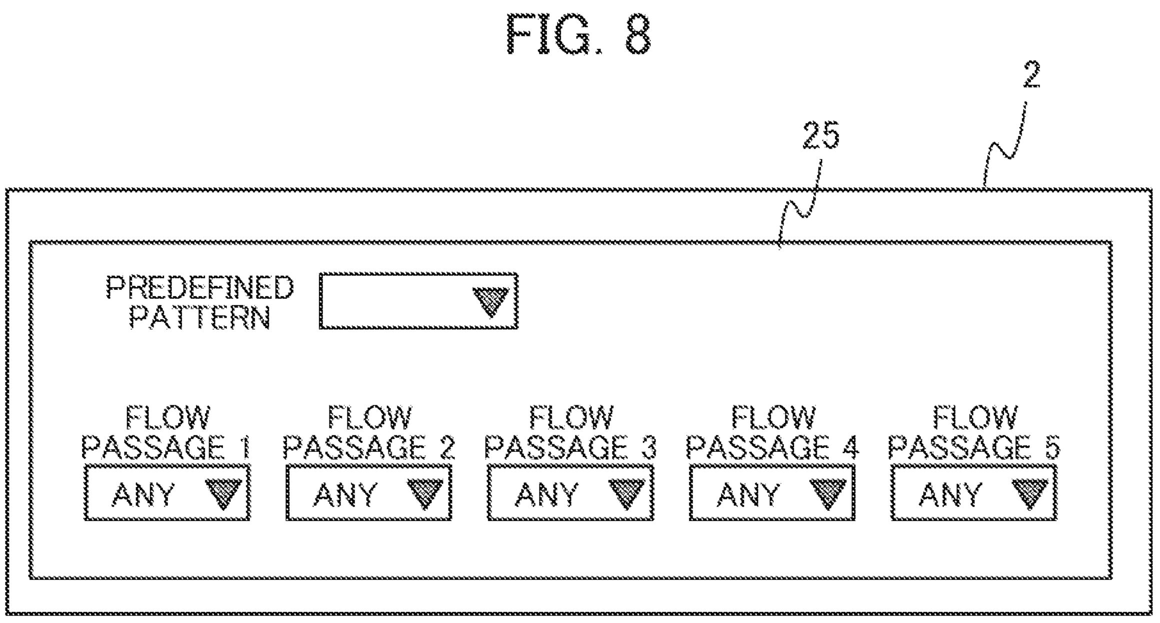
FIG. 8 is a drawing illustrating a display example of a registration screen for selecting the predefined pattern illustrated in FIG. 7 to register the separation column installation pattern.
Figure 9:
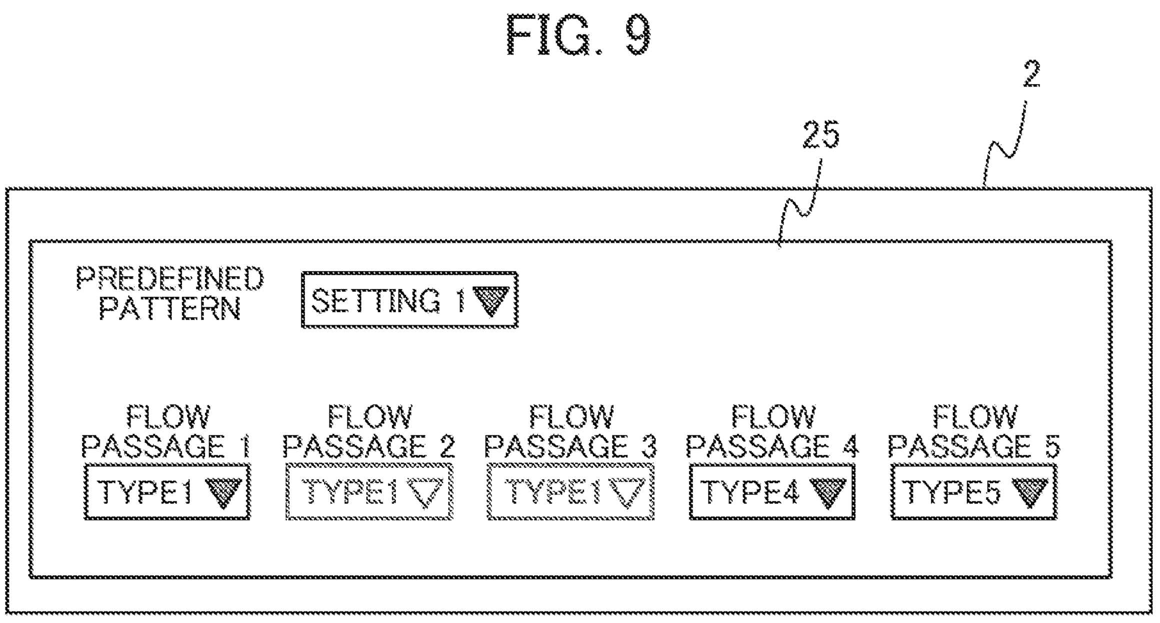
FIG. 9 is a drawing illustrating a display example of the registration screen for selecting the predefined pattern illustrated in FIG. 7 to register the separation column installation pattern.
Figure 10:
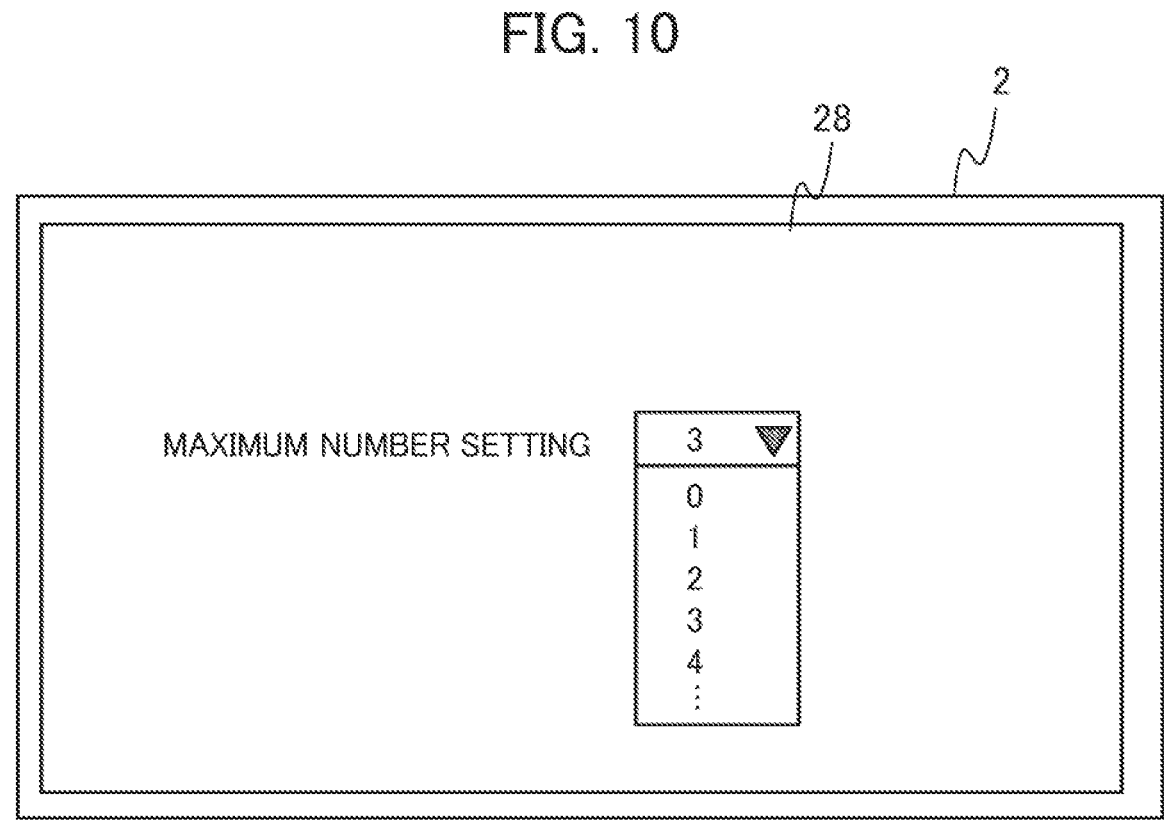
Figure 6:
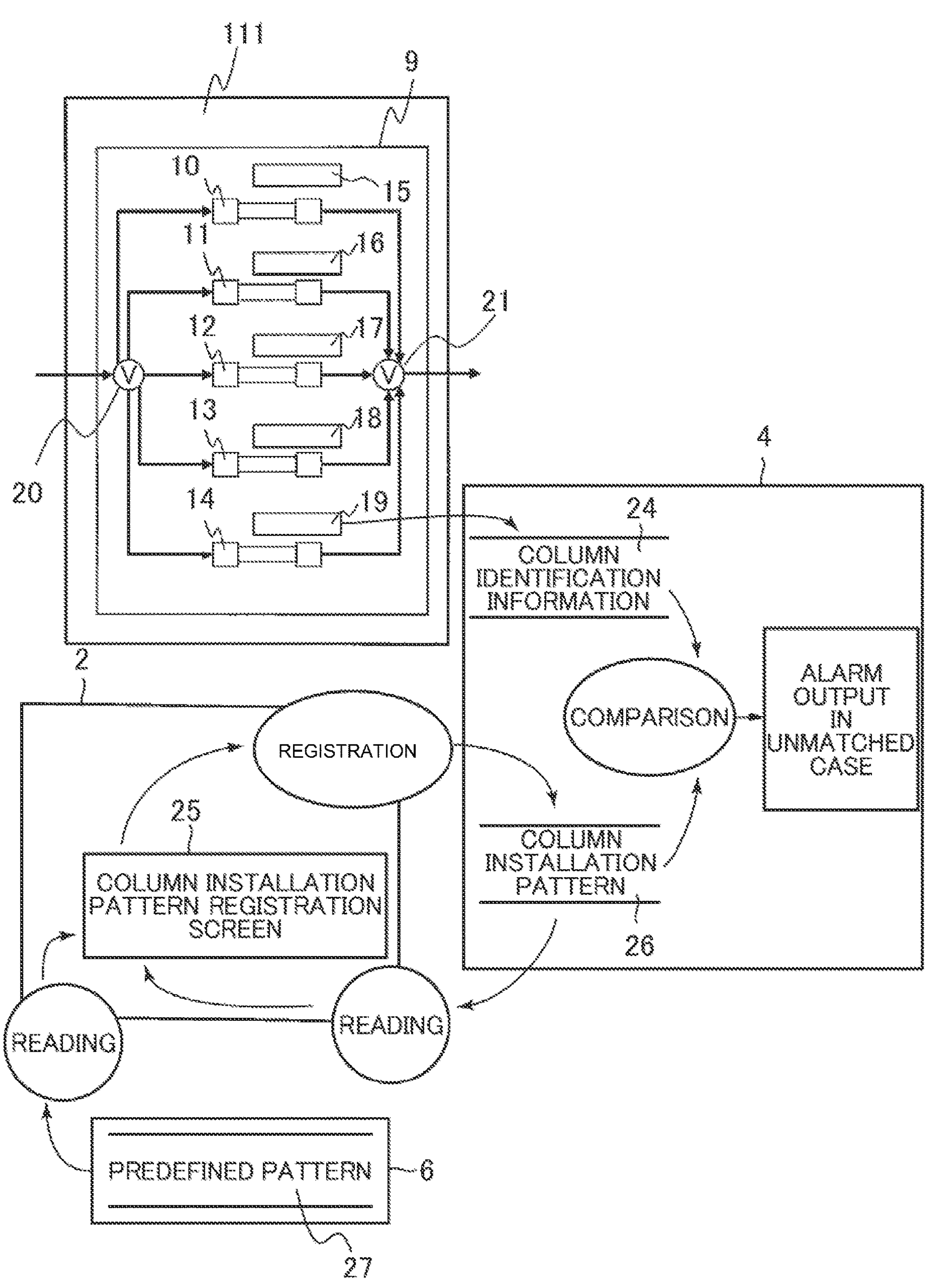

Next, details about the control by comparison between separation column identification information and separation column installation patterns and also the flow of installation procedure for the separation columns 10, 12, 13, 14 will be described with reference FIGS. 6 to 10. FIG. 6 is a drawing schematically illustrating how comparison is made between separation column identification information and a separation column installation pattern. FIG. 7 is a drawing indicating examples of predefined patterns in a case where up three same-type separation columns are installable in five flow passages. FIG. 8 and FIG. 9 are drawings showing display screen examples displayed when registering a separation column installation pattern selected from the predefined patterns shown in FIG. 6. FIG. 10 is a drawing showing a screen display example appearing when selecting a predefined pattern shown in FIG. 6 and registering a maximum number of same-type separation columns installable.

As shown in FIG. 6, in the present embodiment: when the separation columns 11, 12, 13, 14 are installed, identification mechanisms 15, 16, 17, 18, 19 read the identifiers 401 respectively affixed to the separation columns 10, 11, 12, 13, 14. The computer in the control unit 102 compares the separation column identification information 24 stored, being associated with the installation positions (flow passages) in the separation column oven 9, with the separation column installation pattern 26 pre-registered on the separation column installation pattern registration screen 25 and determines whether or not the comparison result is a match.

Therefore, for the automatic analyzer of the present embodiment, the user registers, before installing the separation columns 10, 11, 12, 13, 14, a separation column installation pattern 26 like the ones shown in FIG. 7 on the separation column installation pattern registration screen 25 displayed, as shown in FIG. 8 and FIG. 9, in the display unit 2. The input operation for registration is desirably made in the input unit 3 or in the display unit 2 of a touch-panel type.

On the separation column installation pattern registration screen 25, a pattern appropriate for the tendency of analysis made in the laboratory can be selected from the predefined patterns 27.

In cases where up to three same-type separation columns are installable in the five flow passages in the separation unit 111, the predefined patterns 27 may be, for example, "SETTING 1", "SETTING 2", "SETTING 3", - - - , as indicated in FIG. 7.

In FIG. 7, "TYPE" indicates that a specific type of separation column can be installed. "ANY" indicates that any type of separation column different from the specific type can be installed.

An example case in which, on the separation column installation pattern registration screen 25, a predefined pattern 27 is selected and is then registered as a separation column installation pattern 26 is illustrated in FIG. 8 and FIG. 9.

When the user selects a defined pattern ("SETTING 1" in FIG. 8 and FIG. 9) out of the predefined patterns 27 shown in FIG. 7, the fields of the flow passages 1 to 5 are each reset to "NONE" as shown in FIG. 8.

For each field, a separation column type is selectable using a pull-down menu. However, the selection method is not limited to a pull-down menu, and various selection methods can be used.

When a flow passage is required to use the same type of separation column as for another flow passage, the field for the flow passage is made uneditable. In this case, it is desirable that, for the predefined patterns 27, editable fields and uneditable fields on the separation column installation pattern registration screen 25 are positionally fixed and that the items shown in the pull-down list for each editable field are limited as required.

Also, it is desirable that, in cases where the maximum number of separation columns of a specific type installable in each defined pattern is set on the separation column maximum installation number registration screen 28 and the maximum number of separation columns of the specific type are already set on the separation column installation pattern registration screen 25, the pull-down lists for other editable fields are controlled to make only other separation column types selectable.

To be specific, when, out of the predefined patterns 27, "SETTING 1" shown in FIG. 7 is selected by the user, the separation column installation pattern registration screen 25 is controlled as follows.

As shown in FIG. 7, in the case of "SETTING 1", the flow passages 2 and 3 are required to use the same type of separation column as used by the flow passage 1, so that the flow passages 1, 4, and 5 are displayed to allow editing, whereas the flow passages 2 and 3 are made uneditable. When a separation column type is set for the flow passage 1, the same separation column type is automatically set for the flow passages 2 and 3.

If, in cases where the separation columns for the five flow passages in the separation unit 111 can include up to three same-type separation columns whereas, at the time of editing for the flow passage 1, a specific separation column type (e.g. "TYPE4" or "TYPE5") is already set for the flow passage 4 or 5, setting the specific separation column type also for the flow passage 1 causes the same-type separation columns to total four exceeding three set as the maximum number of same-type separation columns. Hence, as shown in FIG. 9, the pull-down list for the flow passage 1 is controlled not to show the specific separation column type ("TYPE4" or "TYPE5").

Similarly, at the time of editing for the flow passage 4 or 5, when a specific separation column type ("TYPE1") is already set for the flow passage 1, setting the specific separation column type also for the flow passage 4 or 5 results in setting the same separation column type for four flow passages. To prevent this from happening, the pull-down lists for the flow passages 4 and 5 are controlled, as shown in FIG. 9, not to show the specific separation column type ("TYPE1").

Similarly, in the case of "SETTING 2" in FIG. 7, the flow passage 2 and the flow passage 4 are required to use the same types of separation columns as for the flow passage 1 and the flow passage 3, respectively. Therefore, the separation column type is optional only for the flow passages 1, 3, and 5. Furthermore, in the case of "SETTING 3" and "SETTING 4" in FIG. 7, a separation column type is already set for each flow passage, so that no other separation column type can be selected.

The separation column maximum installation number registration screen 28 shown in FIG. 10 is used, when the user defines an installation pattern for the separation columns 10, 11, 12, 13, 14 installable in the flow passages in the separation unit 111, to register a maximum number of same-type separation columns which can be included in the separation columns 10, 11, 12, 13, 14 being installed. The screen is displayed in the display unit 2.

The separation column installation patterns 26 registered on the separation column installation pattern registration screen 25 and the maximum installable number of same-type separation columns registered on the separation column maximum installation number registration screen 28 are inputted to the computer 4 via the interface 1 and are stored in an appropriate memory area.

Referring back to FIG. 6, when the user installs the separation columns 10, 11, 12, 13, 14 in the installation positions of one of the flow passages in the separation column oven 9, the identification mechanisms 15, 16, 17, 18, 19 read the identifiers 401 affixed to the separation columns 10, 11, 12, 13, 14 installed in the respective installation positions.

The identification information read is inputted to the computer 4 in the control unit 102 via the interface 1 and is then associated, in the computer 4, with the flow passages 1 to 5 in the separation column oven to, thereby, generate the separation column identification information 24. This step is equivalent to the identification step in which, when the identification columns 10, 11, 12, 13, 14 are installed in the installation positions, the identifiers 401 provided on the separation columns 10, 11, 12, 13, 14 are read.

The separation column identification information 24 is compared with the predefined separation column installation pattern 26, and, when the comparison result is a non-match, an alarm is outputted to the display unit 2 in the control unit 102. This step is equivalent to the determination step in which whether or not the identification information read from the identifiers 401 in the identification step matches the pre-registered installation pattern and to the notification step in which, when the determination result is a non-match, an alarm is notified.

The alarm may be in the form of an error display on the screen in the display unit 2 or a sound output, but it may be in any other form as far as it notifies that wrong types of separation columns are installed in wrong positions.

It is also desirable that the computer 4 in the control unit 102 can mask, out of the separation columns 10, 11, 12, 13, 14, ones in non-matching positions to put them out of use for analysis. In this case, the analysis is desirably carried out using, out of the separation columns 10, 11, 12, 13, 14, only the ones in matching positions.

The comparison between the separation column identification information 24 and the separation column installation pattern 26 is desirably carried out at the timing when the cover of the separation column oven 9 is closed. This allows the user to be alarmed before prime processing is executed after the cover of the separation column oven 9 is closed and prevents the prime processing from being executed.

The timing of the comparison or alarming is not limited to when the cover of the separation column oven 9 is closed. It may also be when the separation columns 10, 11, 12, 13, 14 are installed in any positions.

The above embodiment has been described based on a format in which the user registers a separation column installation pattern 26 selected from the predefined patterns 27, but the format is not a limited one, and the one as described below may also be used.

For example, suppose that, with the separation columns 10, 11, 12, 13, 14 installed in the separation column installation positions in the separation column oven 9, equilibration and cleansing by use of a buffer and flow passage purging have been completed without any problem whereas no separation column installation pattern 26 has been registered.

A mode may be employed which, in such a case, makes it possible to, when the identification information on the separation columns 10, 11, 12, 13, 14 is read, register the current state of separation column installations as an initial separation column installation pattern 26. It is desirable that this mode becomes effective, for example, only at the time of analyzer setting up or when the analyzer is operated by a service person.

Next, the effects of the present Embodiment will be described.

The automatic analyzer 100 of the present embodiment described above is provided with the identification mechanisms 15, 16, 17, 18, 19 that read, when the separation columns 10, 11, 12, 13, 14 are installed in installation positions, the identifiers 401 provided, on the separation columns 10, 11, 12, 13, 14, the computer 4 that determines whether or not the identification information read by the identification mechanisms 15, 16, 17, 19 from the identifiers 401 matches the pre-registered installation pattern, and the display unit 2 that notifies an alarm when the computer 4 determines that the identification information does not match the installation pattern.

The above configuration makes it possible, in the automatic analyzer 100 to carry out chromatographic analysis using plural, particularly, plural types of separation columns, to detect, out of the separation columns 10, 11, 12, 13, 14, ones installed in wrong positions before the separation columns are put in use.

For example, in a format in which the user is to select a composition of the solvent to be used as a mobile phase for a separation column type and an installation position displayed on the screen in the operation unit, it is possible that the user, by erroneously recognizing the separation column type and the installation position displayed on the screen, sets a solvent composition for a different type of separation column. Such an error may result in detection accuracy deterioration and separation column breakage.

In the case of a format in which separation column identification information is read, the separation column type is identified based on the information, and the composition of the solvent corresponding to the separation column type is determined by searching a table of solvent compositions predefined for various separation column types, problems such as detection accuracy deterioration and separation column breakage caused when a wrong separation column is used or when a wrong solvent composition 1*s* set do not occur.

However, when any separation column installed in the analyzer is of a wrong type, object item analysis cannot be made. In such a case, it becomes necessary to replace the separation column and redo preprocessing, as a result, causing a throughput reduction and a solvent waste.

The separation columns are used being connected to flow passages, and when, at the time of changing the separation columns, the separation column types and the composition of the solvent used as a mobile phase largely change, it becomes necessary, in order to avoid a carry-over in the flow passages, to carry out equilibration for a long period of time and replace the solvent. Therefore, frequently changing the separation column types and installation positions causes a throughput reduction.

Considering the above-described aspects, even though the separation column installation positions can be arbitrarily set, it is desirable to use the analyzer with the selections of separation column types and the settings of installation positions decided to a certain extent.

Against the problems as described above, according to the configuration of the present invention, analysis can be carried out in a state where the separation columns 10, 11, 12, 13, 14 of intended types are securely installed in aimed positions. This makes it possible, compared with where existing types of analyzer configurations are used, to reduce human errors and throughput decreases, and, as a result, effects to reduce waste of separation columns, solvents, and time are generated.

Also, with the separation column installation pattern registration screen 25 for registering, as installation patterns, the types of the separation columns 10, 11, 12, 13, 14 installable in the respective flow passages further provided, the user can select, out of the predefined installation patterns, one corresponding to the tendency of analysis made in the laboratory, so that the user is allowed to freely carry out analysis according to the operating conditions involved. This also makes it possible to reduce human errors.

Also, with the separation column maximum installation number registration screen 28 for registering a maximum number of same ape separation columns installable in the flow passages among the separation columns 10, 11, 12, 13, 14 farther provided, also, the user can select, out of the predefined installation patterns, one corresponding to the tendency of analysis made in the laboratory, so that the user is allowed to freely carry out analysis according to the operating conditions involved.

In cases where the maximum number has been set and the installation of the maximum number of specific same-type separation columns included in the separation columns 10, 11, 12, 13, 14 has been registered, only separation columns of other than the specific types can be selected and registered, on the separation column installation pattern registration screen 25, as separation columns 10, 11, 12, 13, 14 for installation in other installation positions. This prevents wrong separation column types from being included in the predefined patterns, so that the analyzer capable of analysis with higher accuracy can be provided.

The analyzer has a mode in which, when the identification information does not match the preset installation pattern, the current installation pattern, of the separation columns 10, 11, 12, 13, 14 can be registered as a new installation pattern. This generates effects to save setting trouble for the user and allow the analyzer to be automatically set up and started up as intended by the user without being restricted by the predefined patterns 27.

When the identification information is determined not to match the installation pattern, out of the separation columns 10, 11, 12, 13, 14, the ones in non-matching positions are masked, and analysis is carried out using the ones, out of the separation columns 10, 11, 12, 13, 14, in matching positions. In this way, analysis is prevented from being carried out using incorrectly installed separation columns, so that waste of separation columns can be prevented.

<Others>

The present invention is not limited to the above embodiment, and can be modified in various ways and applied in various manners. The above embodiment has been described in details to make the invention easy to understand, and the invention is not limited to the analyzer including all the configurations described.

LIST OF REFERENCE SIGNS

1 interface
2 display unit (notification unit)
3 input unit
4 computer (determination unit)
5 external storage unit
6 memory
7 printer
8 sample introduction unit
9 separation column oven
10, 11, 12, 13, 14 separation column
15, 16, 17, 18, 19 identification mechanism (identification unit)
20 first separation column selector valve
21 second separation column selector valve
22 detector
23 A/C converter
24 separation column identification information
25 separation column installation pattern registration screen (type setting unit)
26 separation column installation pattern
27 predefined pattern
28 separation column maximum installation number registration screen (maximum number setting unit)
100 automatic analyzer
101 analysis unit
102 control unit
110 preprocessing unit
111 separation unit
112 detection unit
201 sample introduction solvent
202 solvent sending pump
203 solvent switch valve
204 injection valve
205 sample loop
206 sipper
207 reaction solution disk
208 reaction vessel
209 syringe
401 identifier

What is claimed is:

1. An automatic analyzer that includes a preprocessing unit, a separation unit comprising a plurality of flow passages, a detection unit, and a control unit, in which a plurality of types of separation columns are installable on each flow passage of the plurality of flow passages of the separation unit, the automatic analyzer comprising:

an identification module, executed by the control unit, for reading an identifier provided on a separation column when the separation column is installed at an installation position in the separation unit, the installation position being a selected flow passage of the plurality of flow passages;

a determination processor for determining whether identification information of the identifier read by the identification module matches an installation pattern registered in advance or not;

a notification module for generating an alarm when the identification information is determined not to match the installation pattern by the determination processor;

a type setting module, executed by the control unit, for registering a type of an installable separation column for each flow passage as the installation pattern; and a maximum number setting processor for registering a maximum installation number of same type separation columns installable on the plurality of flow passages of the separation unit and controlling the type setting module to prevent selection of a specific separation column type when the maximum installation number of that specific type has been registered, wherein the automatic analyzer provides one or more registration restrictions for installation of the installation pattern and suppresses the installation of the installation pattern when the maximum installation of the same type separation columns is exceeded.

2. The automatic analyzer according to claim 1, wherein when the maximum installation number is set and an installation of a maximum installation number of specific separation columns whose maximum installation number is set is registered, the type setting module is configured to allow registration of only a separation column of a different type from the specific separation column is allowed to be registered when selecting the type of the separation column at another position by the type setting module.

3. The automatic analyzer according to claim 1, wherein the automatic analyzer has a mode capable of registering a current installation pattern of a separation column as a new installation pattern when the identification information is different from a preliminary set installation pattern.

4. The automatic analyzer according to claim 1, wherein the control unit masks a separation column at an unmatched part and executes an analysis with only the separation column at a matched part when the determination processor determines that the identification information does not match the installation pattern,
wherein the unmatched part comprises an installation position having a separation column whose identification position does not match the registration pattern, and
wherein the matched part comprises an installation position having a separation column whose identification position does match the registration pattern.

5. The automatic analyzer according to claim 1, wherein the identification module reads an identifier of a new separation column and the determination processor reconfirms whether identification information of the new separation column matches the installation pattern.

6. The automatic analyzer according to claim 1, wherein the automatic analyzer selects a new separation column to replace a used separation column.

7. The automatic analyzer according to claim 1, wherein the type setting module provides a selection interface for selecting the type of the separation column.

8. The automatic analyzer according to claim 7, wherein the maximum number setting processor restricts available selections in the selection interface when the maximum installation number of a specific type has been registered.

9. The automatic analyzer according to claim 1, wherein the identification module reads the identifier provided on the separation column to obtain the type of the separation column installed at the installation position.

10. The automatic analyzer according to claim 1, wherein the installation pattern includes a registered type of separation column for each installation position on the flow passage.

11. The automatic analyzer according to claim 1, wherein the automatic analyzer registers the current installation pattern of the separation column as a new installation pattern upon user confirmation when the determination processor determines that the identification information does not match the installation pattern.

12. A method for installing a separation column in an automatic analyzer that includes a preprocessing unit, a separation unit comprising a plurality of flow passages, a detection unit, and a control unit, in which a plurality of types of separation columns are installable on each flow passage of the plurality of flow passages of the separation unit, the method comprising:
registering a type of an installable separation column for each flow passage as an installation pattern;
reading an identifier provided on a separation column when the separation column is installed at an installation position in the separation unit, the installation position being a selected flow passage of the plurality of flow passages;
determining whether identification information of the identifier matches the installation pattern registered in advance or not;
generating an alarm when the identification information is determined not to match the installation pattern;
registering a maximum installation number of same type separation columns installable on the plurality of the flow passages of the separation unit; and
controlling, by the maximum number setting processor, the type setting module to prevent selection of a specific separation column type when the maximum installation number of that specific type has been registered,
wherein the automatic analyzer provides one or more registration restrictions for installation of the installation pattern and suppresses the installation of the installation pattern when the maximum installation of the same type separation columns is exceeded.

* * * * *